United States Patent [19]
Perkel

[11] 3,834,653
[45] Sept. 10, 1974

[54] CLOSED LOOP ROLL AND YAW CONTROL FOR SATELLITES

[75] Inventor: Harold Perkel, Levittown, Pa.

[73] Assignee: RCA Corporation, New York, N.Y.

[22] Filed: Mar. 27, 1972

[21] Appl. No.: 238,483

[52] U.S. Cl............. 244/1 SA, 235/150.2, 244/321
[51] Int. Cl............................................. B64g 1/10
[58] Field of Search............ 244/1 SA, 1 SS, 77 SS, 343/100 ST; 235/150.2, 150.25, 150.27 244/3.21

[56] References Cited
UNITED STATES PATENTS

| | | | |
|---|---|---|---|
| 3,232,561 | 2/1966 | Adams............................ | 244/1 SA |
| 3,350,548 | 10/1967 | Whitaker................... | 235/150.25 X |
| 3,427,453 | 2/1969 | Gill et al....................... | 244/1 SA X |
| 3,429,524 | 2/1969 | Buckingham et al............. | 244/1 SA |
| 3,521,835 | 7/1970 | Braga-Illa et al. ................ | 244/1 SA |
| 3,643,259 | 2/1972 | Entner...................... | 235/150.27 X |
| 3,695,554 | 10/1972 | Phillips........................... | 244/1 SA |

Primary Examiner—George E. A. Halvosa
Assistant Examiner—Barry L. Kelmachter
Attorney, Agent, or Firm—Edward J. Norton, Joseph D. Lazar

[57] ABSTRACT

A magnetic torquing control system for the attitude control of pitch momentum biased satellites utilizing a closed loop for roll-axis control by interacting the satellite's magnetic dipole with the earth's magnetic field. The closed-loop system includes a pair of attitude sensors whose output error signals are processed in the satellite-mounted logic circuits to control correcting torques. At a predetermined clock-controlled time or, in response to control or sensing signals from a magnetometer, a torquer such as a magnetic dipole is energized at the position of its satellite's orbit relative to the magnetic equator to develop a magnetic field which interacts with the magnetic field of the earth to torque, primarily, the roll axis to correct thereby the errors in attitude of the pitch axis.

7 Claims, 8 Drawing Figures

CLOSED LOOP ROLL AND YAW CONTROL FOR SATELLITES

BACKGROUND OF THE INVENTION

1. Field of the Invention

This invention relates to attitude control for pitch momentum biased satellites and more particularly to control of the roll and yaw axes by automatic magnetic torquing in a closed loop control system.

2. Description of the Prior Art

A stabilized orbiting satellite requires a means for changing its attitude when it has deviated from its desired orientation or position relative to its orbit.

Magnetic torquing of spin-stabilized satellites is known. Such magnetic torquing systems use a magnetic field from torquers such as a coil or electromagnet to interact with the magnetic field of the earth to develop a reaction torque which causes the reference axis of the satellite to be repositioned an amount proportional to the torquing time and flux magnitude as known in the art. Known systems require that ground control command signals be transmitted to the satellite to effect the desired magnetic torquing operations. In one of the known systems, a series of the satellites known as TIROS operated by NASA, a clock aboard the satellite provides time signals according to a pre-set schedule for controlling the operation of the magnetic torquing system relying on assumed attitude errors.

In other known systems, the satellite is provided with sensing devices which produce signals representing the attitude of the satellite. The sensor signals information are processed and transmitted to a ground station which in turn provides the necessary command or control signals for directing the motion of the satellite to correct for the anomalies which may have occurred. The command signals for altering the attitude may actuate any of the attitude control devices to effect the required torques. Either of such previous systems, just described, are known in the art as an "open-loop" control system.

The problem with such open-loop control systems is in effecting a correcting command signal at a time during the orbit of the satellite during which the magnetic field of the earth is properly situated relative to the position of the satellite. To effect the proper magnetic torque for correcting a given or known error in attitude, the phasing of the torquer must be in phase with the polarity of the earth's magnetic field. Heretofore the method for effecting such magnetic torquing operations required ground station commands in the control loop. A disadvantage in such open-loop systems is that the ground station link in the control system necessitates delays in the correction operations by personnel who must interpret satellite signals and provide the appropriate and timely command signals. Such delays may make it difficult to achieve attitude corrections that are best made more frequently as the satellite becomes properly positioned in the magnetic field of the earth. The expense of operating ground stations with personnel serving attitude correction problems is also a burdensome disadvantage in such open-loop control systems.

SUMMARY OF THE INVENTION

According to the present invention a closed loop control system for aligning the pitch axis of a satellite with the orbit normal, includes one or more attitude sensors with electronic logic responding to the sensed attitude error generated by the sensors to energize a magnetic torquer with energizing currents of appropriate polarity and magnitude to effect the necessary torque to correct the satellites attitude. The polarity and direction of the control torque is primarily along the local vertical, the local vertical being the line between the satellite and the center of the earth.

DESCRIPTION OF THE PREFERRED EMBODIMENT

Figure 1A:
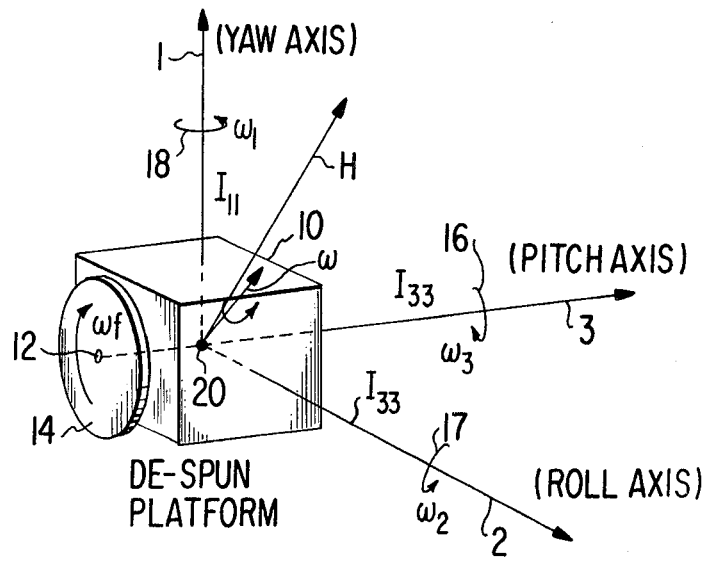
FIG. 1a is a schematic diagram of a satellite showing the three axes thereof as related to the momentum and velocity vectors.

Referring to FIG. 1a, there is shown a body 10 which may be a spacecraft or satellite of any suitable or desired shape. Extending from the center of mass are three mutually perpendicular spacecraft axes designated as 1, 2, and 3 corresponding to conventionally designated yaw, roll, and pitch axes respectively.

The pitch (3) axis is defined to be that direction in the spacecraft 10 collinear with the total angular momentum vector H when the spacecraft 10 is operating in its intended mission. The pitch axis is parallel to the axis 12 about which a momentum wheel 14 is rotated. The sign convention is that the pitch axis, shown in FIG. 1a, is positive and is in the positive direction of the angular momentum vector H. Thus, according to the usual convention in this art, the angular momentum possessed by the spacecraft 10 is equivalent to having the body 10 spinning clockwise about the pitch axis as shown along the arrow direction 16 representing the angular velocity $\omega_3$ about the pitch axis. The yaw and roll axes are mutually perpendicular and orthogonal to the pitch axis. The axis system as defined and used herein according to the usual convention is right-handed in the order 1-2-3. The 3 axis shall at times, it should be noted, be referred to herein as the pitch or spin axis. The 3 axis is parallel to the axis 12 of the spinning wheel 14.

According to the laws of motion, the spacecraft 10 includes a first (translational) motion of the center of mass 20 and a second motion of the spacecraft 10 about its center of mass 20. The motion about the center of mass 20 is represented by $\omega$, conventionally called the angular velocity vector, which is shown passing through the center of mass 20 along the line about which the spacecraft 10 is rotated. The length of the vector is proportional to the angular speed of the spacecraft 10 about that line. The arrow head 16 of the angular velocity vector indicates the direction of rotation, in this case clockwise, about the line as shown.

For the purposes of describing one embodiment of the present invention, the momentum vector H is assumed to be collinear with the pitch axis 3. Further the pitch axis is normal to the plane of the orbit of the satellite.

An orbiting satellite which has stored angular momentum can be oriented in such a way that the direction, defined by the angular momentum vector H (FIG. 1), is aligned with the orbit normal, by an automatic means, according to the invention, which includes conventional torquers, sensors, and electronic logic circuits in a closed-loop without the need of ground control command.

Figure 1B:
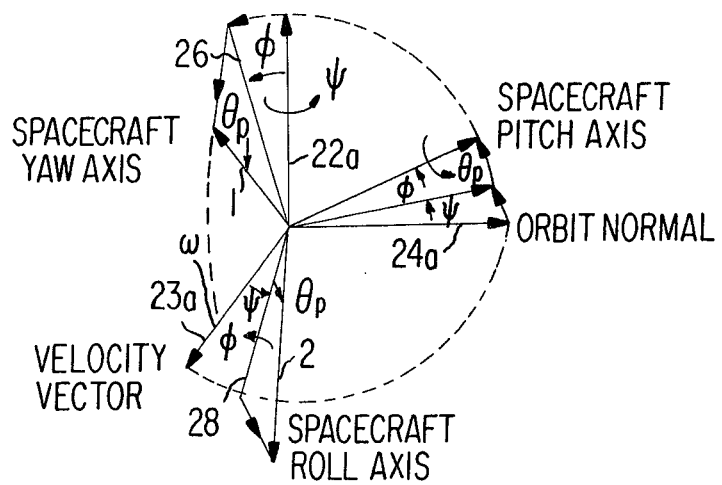
FIG. 1b is a diagram showing the axes in inertial conventions related to the orbit normal.

Referring now to FIG. 1b there is shown a diagram of several of the parameters that will be used in the description to follow of one form of the invention. The 1, 2, and 3 axes described above with respect to FIG. 1a are shown in their relative postions in FIG. 1b, it being understood that these axes are identical to the axes heretofore described. The local vertical vector or direction 22a is colinear with the desired reference direction for orienting the spacecraft yaw axis (1). The vector 24a indicates the direction perpendicular to the orbit plane of the spacecraft. The line 26a represents the position of the yaw axis if the spacecraft were to have a yaw angle $\psi$ (psi) and a roll angle $\phi$ (phi) but no pitch angle $\theta_p$ (theta) relative to the orbital coordinates 22a, 24a, and 23a. The line 28a similarly represents the position of the roll axis, with a yaw angle $\psi$ and a roll angle $\phi$, but no pitch angle $\theta_p$. The angles as shown by the several vectors and directions are defined as follows:

$\theta_p$ is the spacecraft pitch error, defined as the angle between the yaw axis and the plane formed by the pitch axis and the local vertical 22a;

$\phi$ is the spacecraft roll angle defined as the angle between the pitch axis and the plane formed by the orbit normal (24) and velocity vector 23a;

$\psi$ is the spacecraft yaw angle defined as the angle between the orbit normal 24a and the plane defined by the pitch axis 3, and the local vertical 22a.

The practice of this invention depends on the property of a spinning satellite which is essentially a gyroscope. One property of a gyroscopically stabilized spacecraft is that the direction of its spin axis in space cannot move unless deliberately torqued.

Since roll and yaw interchange sinusoidally throughout the orbit for such a spin oriented spacecraft, the position of the spin axis is uniquely determined without the necessity of direct yaw measurement, which is most difficult to measure for an earth oriented spacecraft.

According to the invention, the errors in roll are used as the control input parameter of the closed-loop system as will be described.

Figure 2:
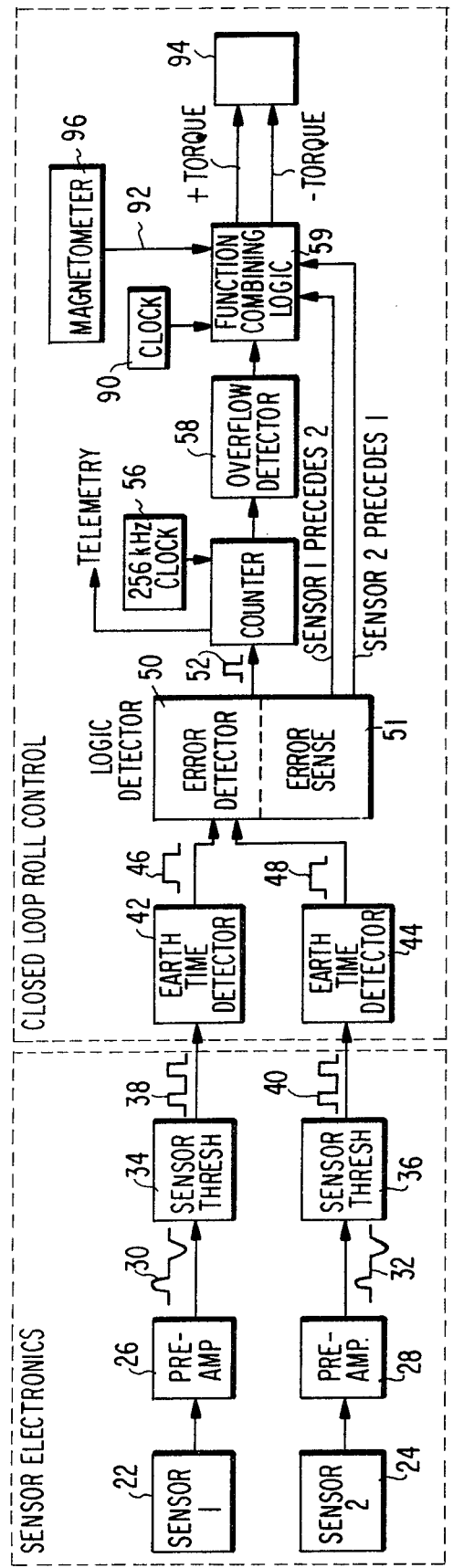
FIG. 2 is a block diagram of a closed-loop roll control illustrating one form of the invention.

FIG. 2 is a block diagram of a closed loop control circuit chosen for purposes of illustrating the invention. A pair of sensors 22 and 24 suitably positioned on the momentum (fly) wheel 14 of the satellite 10 are oriented to respond to light energy preferably in the infrared range for viewing the earth's surface on each scan of rotation on the momentum wheel 14.

The satellite 10 may be either a dual-spin type as shown or a spinning type not shown but well known in the art. For spinning type satellites the sensors are suitably mounted to provide signals needed to indicate the attitude of the satellite.

The signal output from the sensors are amplified by preamplifiers 26 and 28 developing waveforms 30 and 32, which are applied to a pair of threshold detectors 34 and 36. The output signals generated by the threshold detectors are indicated by waveforms 38 and 40. Signals 38 and 40 are applied to the earth time detectors 42 and 44 which determine the period of time that the earth is being viewed by the respective sensors. Any suitable integrator or counter will serve this function. These earth-viewed time period signals are represented by the pulses 46 and 48 developed at the output of the respective detectors 42 and 44. The pulses 46 and 48 are applied to a logic detector circuit comprising an error detector 50, which developes a pulse 52 representing the error of the difference of the sensor signals 22 and 24.

Figure 3B:
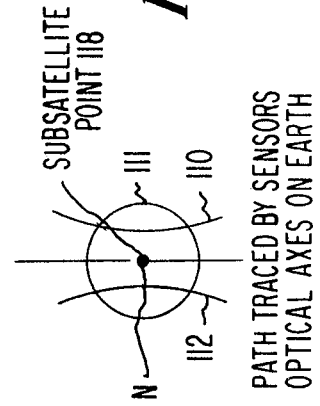
FIG. 3b is a diagram illustrating the path traced on the earth by the optical axes of the sensors.
Figure 3A:
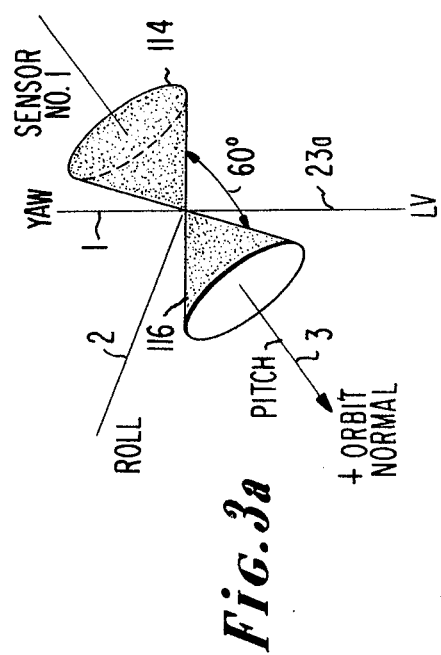
FIG. 3a is a diagram illustrating the cones tracked by the horizing sensor optical axes mounted on a spinning momentum wheel of a dual-spin satellite.

The attitude sensors may be arranged in any suitable manner known in the art. Typically a pair of sensors may be arranged to view the horizon in a "V" configuration at 60° with the local vertical such that the paths 110, 112 traced on the earth 111 from horizon to horizon by a pair of sensors will be as shown in FIG. 3b. The sensors No. 1 and No. 2 mounted on a wheel will trace cones 114, 116 such as shown in FIG. 3a, the spacecraft's axis being shown in relation to the sensor axes. Point 118 is the projection of the satellite on the earth's surface sometimes referred to as the nadir (N).

The attitude error detected by the earth sensors 22 and 24 indicates a misalignment $\phi$ between the angular momentum axis (H) and the plane formed by the roll axis and the orbit normal 24 (FIG. 1b). It is to be noted that roll is the rotation of the satellite roll axis with respect to the plane that is formed by the velocity vector (23a, FIG. 1a) and the orbit normal 24a. A counter 58 of conventional design is arranged to measure the pulse duration of the waveform 52. Counter 54 counts the cycles of a clock 56, for example, generating clock pulses at the rate 256 kHz. The count is directly proportional to the magnitude of misalignment of the angular momentum (H) with respect to orbit normal 24a. When the time differences are zero, or within a specified limit determined by an overflow detector 58, the torquer is cut-off or de-energized.

The overflow detector 58 is conventionally a register of a fixed number of pulses which, upon saturation, generates an output pulse as one input to logic circuit 59. When an error is determined by detector 50, the torquer, 94 aligned parallel to the pitch axis 1 (FIGS. 1a, 1b), is energized to effect the required torquing flux, provided, the satellite is in a proper region of the earth's magnetic field as will be explained. If the error is greater than a predetermined minimum value, the sense of the current flowing in the electromagnet of the torquer 94 is determined by two parameters. One parameter is the error sense which indicates by the error sensor 51 which of the sensor outputs precedes the other indicating the sense of the roll error. Error sensor 51 is a suitable phase detector comparing the signals 46 and 48. The second parameter depends on which portion of the orbit the error is being detected.

Figure 6:
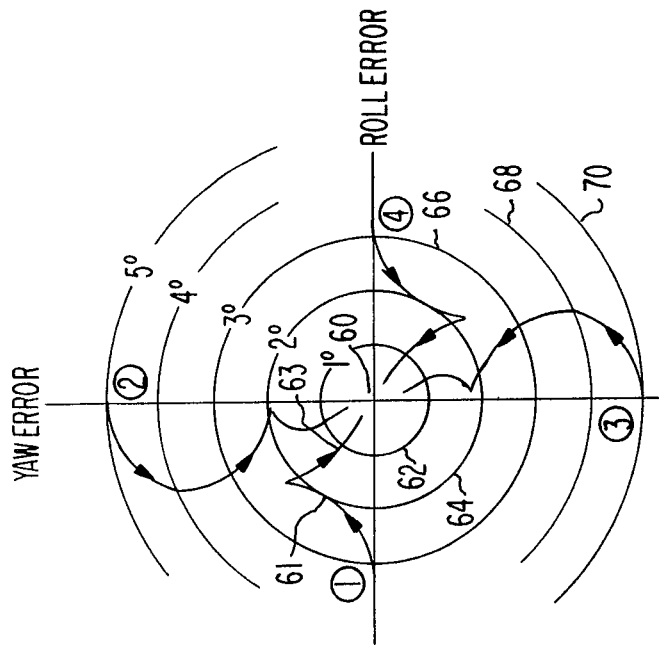
FIG. 6 is a diagram showing the regions for torquing.

The diagram shown in FIG. 6 illustrates the portions of the orbit 72 defined by regions 74 and 76 during which the magnetic field of the earth is of sufficient magnitude to provide the roll correction reaction torque needed. These regions are in the vicinity of the earth's equatorial plane. The magnetic field vector 78 is in orthogonal relation to the control torque vector 80 that is developed to cause a correction movement of the roll axis along vector 82 which is in the plane of the orbit. A correction in the opposite direction of vector 82 as shown would be caused by a control torque in the opposite direction of vector 80 as shown. Since the magnetic field of the earth may be changing direction with respect to the local vertical as the satellite moves in its orbit, as, for example, occurs when the satellite passes the north pole, it is necessary to determine the direction of the resultant torque 82 and particularly whether that roll-correcting torque will be primarily along the local vertical.

The onboard control logic determines if the earth's magnetic field is within the acceptable direction. The determination of the condition of the magnetic field can be made in one of two ways. One method is in the use of a counter and clock that is arranged to be reset as the satellite crosses the plane defined by the earth's equator or some known reference in the orbit. Such information requires a prior knowledge of the magnetic field of the earth with respect to the position of the satellite in orbit.

The second method for such a determination of the sense of the earth's magnetic field is in the use of a magnetometer situated in the spacecraft. As known in the art, a magnetometer measures the direction and magnitude of the magnetic field of the earth relative to the spacecraft in the orbit.

With such determined information, whether by the known data based on a prior knowledge or by direct indication of the magnetometer, the resulting direction of the required torque can be determined as to when the torquer is to be energized.

For use of the a prior knowledge method a clock 90 provides control signals to the logic circuit 59 for gating the signals from detector 58 with appropriate polarity to energize the torquer 94 with the proper polarity of flux. For use of direct sensing of the earth's magnetic field, a magnetometer 96, rather than a clock 90, provides signals corresponding to the magnitude and direction of the earth's magnetic field to the logic circuit 59 over path 92. The torquer is energized to develop the required torque if an error is indicated.

Figure 4:
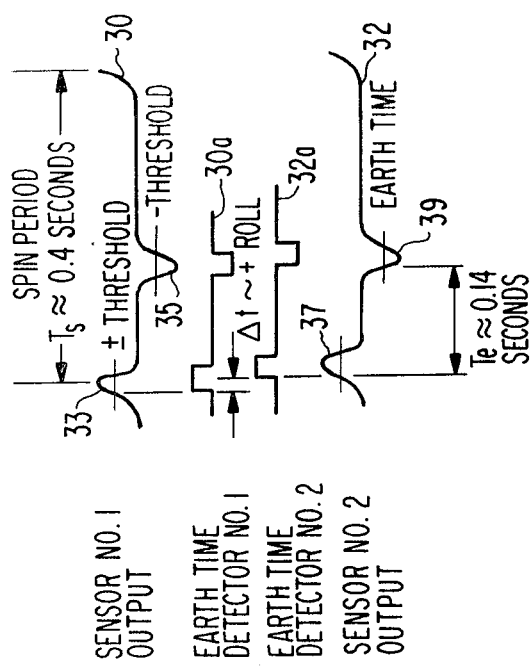
FIG. 4 are waveforms illustrating the outputs of the sensors and detectors for determining the attitude of the satellite.

A typical series of waveforms developed by a pair of sensors is illustrated in FIG. 4. Waveform 30 is generated by sensor No. 1 (22) and waveform 32 by sensor No. 2 (24). The threshold levels are shown on the waves at the portions where the earth-to-sky discontinuities occur. The horizon-to-horizon pulse duration, shown by pulses 33 and 35 for waveform 30 as compared to pulses 37 and 39 for waveform 32 shows a roll error exists by waveform 30a leading waveform 32a by Δt.

The following table summarizes the boundary conditions within which the closed loop system is controlled, according to the invention, for a spacecraft in a 200 nautical mile orbit inclined at 84° with respect to the equatorial plane.

TABLE I ROLL/YAW CONTROL LAW*

| ROLL | DIPOLE | ORBIT ANGLE |
|---|---|---|
| + <br> (−) | − <br> (+) | $\beta$ = 152 to 138 |
| + <br> (−) | + <br> (−) | $\beta$ = 332 to 28 |

*For momentum vector 82 along positive orbit normal (FIG. 6) where $\beta$ = True Anomaly (Measured for Ascending Node).

The table indicates that for a + roll error which is arbitrarily a clockwise rotation of the roll axis, a negative error thus being a counterclockwise rotation, a magnetic dipole would be excited by a current to develop a negative flux field for the portion of the orbit between a true anomaly of 152 to 138° as measured from the ascending node of the orbit as it crosses the plane of the ecliptic.

A negative roll error in the same portion of the orbit would require a positive flux to correct the error. The orbit angle between 332° and 28° requires a positive dipole correction for a positive roll error and a negative correction for a negative error. A similar table for a control law of other orbits will be apparent to those skilled in this art.

Figure 5:
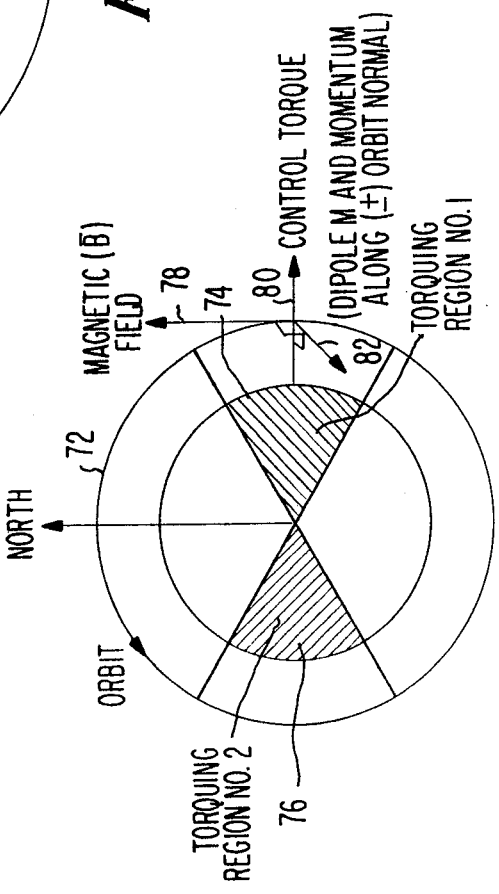
FIG. 5 is a plot of the pitch axis trajectories under roll/yaw control.

The curved traces shown in FIG. 5 are plotted on a series of concentric circles marked by angles in degrees increasing from the center 60 which corresponds to the pitch axis. The roll error is defined by the angle between the orbit normal and the momentum vector H which is coincident with the pitch axis 3 for those situations under consideration in which there is no nutation. The orbit normal is point 60 at the center of the diagram, pointing outward from the plane of the paper. The concentric circles 62, 64, 66, 68, and 70 represent the cones on which the pitch axis could appear at any meridian. The radial distance is plotted as the angular displacement between the pitch axis and the orbit normal as just indicated. The curved traces or trajectories show the motion of the pitch axis as it moves due to magnetic torquing from each of four typical anomalies.

For example, starting at position 1, the attitude error is completely that of roll at 3°. As the satellite is controlled through the two torque correcting cycles indicated by portions 61 and 63, roll corrections also cause yaw deviations in the process. As the trajectory, as shown, converges towards orbit normal at point 60 both roll and yaw deviations have been completely eliminated.

The curve traces illustrated in FIG. 5 starting at points 2, 3, and 4 are the paths followed during the correction of the attitude error indicated by the respective starting positions in the manner described with respect to the initial error starting at position 1. It is to be noted that the starting positions 1 and 4 represent the maximum roll error that are corrected according to the invention about the pitch axis 60 while starting positions 2 and 3 represent the maximum yaw errors that occur about the pitch axis 60.

Although the invention has been illustrated by reference to a satellite operating in a circular and high inclination orbit, it should be understood that its use is not limited only to circular orbits or to a specific inclination. A high inclination orbit is one in which the angle between the earth's polar axis and the orbit normal is approximately a right angle. Such an orbit causes an orbiting satellite to pass through the strongest portions of the earth's magnetic field. Low inclination orbits generally cause the satellite to pass through portions of the earth's magnetic field that have low but still useful magnetic field strengths. The only essential requirement is that the orbit be of sufficient altitude that the satellite pass through a sensible magnitude of the earth's magnetic field. Any of the lowest feasible orbits known in the art increasing in altitude to what is known as a geosynchronous equatorial orbit may be utilized according to the invention for magnetic torquing to correct roll and yaw errors.

At synchronous low inclination orbits, the closed loop control, according to the invention, may be used throughout the orbiting period i.e., on a continuous basis. However, the magnetic dipole of the torquer must be reoriented to produce the torquing dipole along the velocity vector (roll axis). This dipole interacts with the primary magnetic field which is perpendicular to the orbit plane.

What is claimed is:

1. A magnetic torquing system in a closed-loop system in an orbiting pitch momentum biased satellite for automatically controlling the roll error and yaw error of the satellite, to thereby orient the pitch axis to a desired attitude, said pitch axis being colinear with the momentum vector of the satellite, comprising:
 a closed loop consisting essentially of:
 a. roll error sensing means for generating a signal representing a deviation of the roll axis from said desired attitude relative to the pitch axis,
 b. magnetic torquing means comprising a single magnetic dipole for developing a magnetic torque only along a selected axis of the satellite, and
 c. means responsive to said roll error signal to energize said magnetic torquing means to correct the deviation of said roll axis to change the orientation of said momentum vector without changing the magnitude of said momentum vector.

2. A system according to claim 1 wherein said energizing means includes a clock programmed to generate a signal when said satellite is in a portion of its orbit having significant magnetic field strength of the earth's field.

3. A system according to claim 1 wherein said energizing means includes a magnetometer for sensing the magnetic field of the earth, and means for generating a signal from said magnetometer for energizing said magnetic torquing means to correct deviations in said roll axis.

4. A system according to claim 1 wherein said energizing means includes means to determine the sense of the magnetic field generated by said torquing means to correspond to the sense of the earth's magnetic field.

5. A system according to claim 1 wherein said satellite is of the dual-spin type having a momentum wheel, and said error sensing means comprise a pair of horizon sensors oriented to scan the earth's surface on opposite sides of the local vertical.

6. A system according to claim 5 wherein said magnetic torquing means has a major axis which is oriented to be parallel with the spin axis of the momentum wheel.

7. A system according to claim 5 wherein said satellite is in a geo-synchronous orbit whereby the satellite remains in substantially a fixed position above the earth's surface on the equatorial plane of the earth, and wherein said magnetic torquing means is oriented in said satellite to be substantially parallel to the roll axis of the satellite.

* * * * *